(12) United States Patent
Bhageria et al.

(10) Patent No.: US 12,596,923 B2
(45) Date of Patent: Apr. 7, 2026

(54) MACHINE LEARNING OF KEYWORDS

(71) Applicant: International Business Machines Corporation, Armonk, NY (US)

(72) Inventors: Gopal Bhageria, Rajarhat (IN); Siddharth Saraya, Raniganj (IN); Rajesh Kumar Saxena, Kopri Colony (IN); Anindya Ghosh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 16/152,868

(22) Filed: Oct. 5, 2018

(65) Prior Publication Data

US 2020/0110996 A1     Apr. 9, 2020

(51) Int. Cl.
*G06N 3/08*     (2023.01)
*G06F 16/951*     (2019.01)

(52) U.S. Cl.
CPC .............. *G06N 3/08* (2013.01); *G06F 16/951* (2019.01)

(58) Field of Classification Search
CPC ........ G06N 3/08; G06N 5/022; G06F 16/951; G06F 16/355; G06F 16/3329
See application file for complete search history.

(56) References Cited

U.S. PATENT DOCUMENTS

| | | | |
|---|---|---|---|
| 8,457,959 B2 | 6/2013 | Kaiser | |
| 9,569,333 B1 | 2/2017 | Gibbon et al. | |
| 2005/0080795 A1* | 4/2005 | Kapur | ................... G06F 16/951 |

| | | | |
|---|---|---|---|
| 2009/0234832 A1* | 9/2009 | Gao | ..................... G06F 16/3322 |
| | | | 707/999.005 |
| 2010/0325109 A1* | 12/2010 | Bai | ........................ G06F 16/951 |
| | | | 707/E17.089 |
| 2013/0054613 A1* | 2/2013 | Bishop | .................... G06F 16/93 |
| | | | 707/E17.046 |
| 2014/0257973 A1* | 9/2014 | Zamanzadeh | ...... G06Q 30/0246 |
| | | | 705/14.45 |
| 2016/0117624 A1 | 4/2016 | Flores et al. | |
| 2016/0125751 A1* | 5/2016 | Barker | ................ G06F 16/3332 |
| | | | 434/322 |

(Continued)

OTHER PUBLICATIONS

Gulcehre et al. ("Pointing the Unknown Words", arXiv 2016) (Year: 2016).*

(Continued)

*Primary Examiner* — Imad Kassim
(74) *Attorney, Agent, or Firm* — Gavin Giraud, Esq.; Rachel L. Pearlman, Esq.; Heslin Rothenberg Farley & Mesiti P.C.

(57)     ABSTRACT
A method, computer program product, and a system where a processor(s), obtains content from a meeting hosting system during a pre-defined interval. The processor(s) parses the textual content to identify potential keywords. The processor(s) iteratively cognitively analyzes the potential keywords to determine which potential keywords comprise seed keywords, where the seed keywords meet a maturity threshold for inclusion in a data structure, where the iterative cognitive analysis of each potential keyword of the potential keywords is repeated a pre-defined number of times, and where the iteratively cognitively analyzing includes generating and updating the data structure. The processor(s) outputs, based on completing the pre-defined number of times, the data structure comprising the seed keywords.

20 Claims, 7 Drawing Sheets

200

(56) References Cited

U.S. PATENT DOCUMENTS

| | | | |
|---|---|---|---|
| 2017/0310552 A1* | 10/2017 | Wallerstein | H04L 41/12 |
| 2017/0316080 A1* | 11/2017 | Brisebois | G06N 20/00 |
| 2017/0344530 A1* | 11/2017 | Krasadakis | G09B 19/00 |
| 2018/0113933 A1* | 4/2018 | Lewis | G06F 16/9024 |
| 2018/0218075 A1* | 8/2018 | James | G06F 7/24 |
| 2019/0012310 A1* | 1/2019 | Cho | G06F 40/242 |
| 2019/0392040 A1* | 12/2019 | Puniyani | G06F 16/3323 |
| 2020/0019599 A1* | 1/2020 | Lynch | G06F 40/169 |
| 2021/0326714 A1* | 10/2021 | Li | G06F 16/24573 |

OTHER PUBLICATIONS

Godbole et al. ("Building Re-usable Dictionary Repositories for Real-world Text Mining", CIKM'10, Oct. 26-30, 2010) (Year: 2010).*
Mell et al., "The NIST Definition of Cloud Computing", National Institute of Standards and Technology, U.S. Dept. of Commerce, NIST Special Publ. 800-145, Sep. 2011, 7 pages.

* cited by examiner

200

Figure 3:
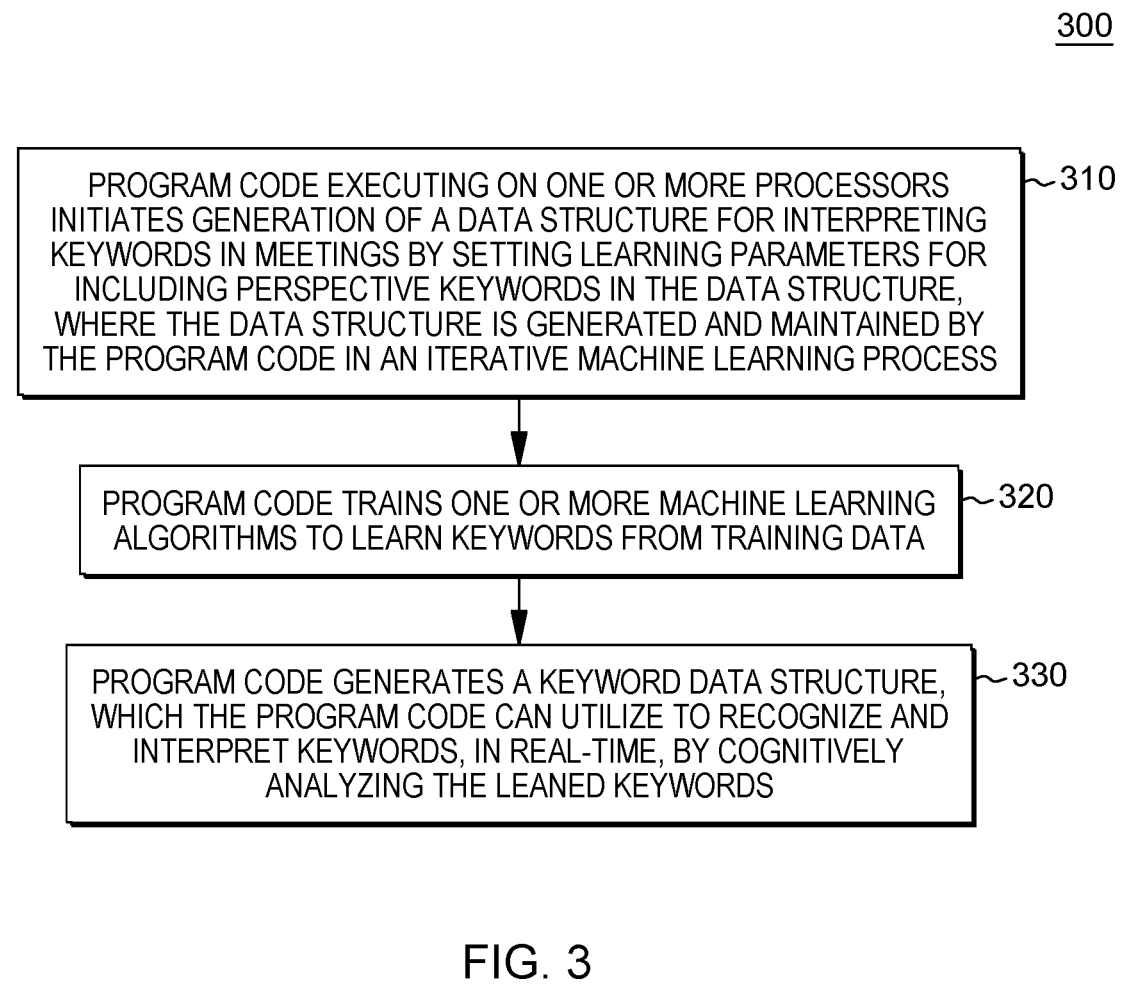

300

PROGRAM CODE EXECUTING ON ONE OR MORE PROCESSORS INITIATES GENERATION OF A DATA STRUCTURE FOR INTERPRETING KEYWORDS IN MEETINGS BY SETTING LEARNING PARAMETERS FOR INCLUDING PERSPECTIVE KEYWORDS IN THE DATA STRUCTURE, WHERE THE DATA STRUCTURE IS GENERATED AND MAINTAINED BY THE PROGRAM CODE IN AN ITERATIVE MACHINE LEARNING PROCESS    ~310

PROGRAM CODE TRAINS ONE OR MORE MACHINE LEARNING ALGORITHMS TO LEARN KEYWORDS FROM TRAINING DATA    ~320

PROGRAM CODE GENERATES A KEYWORD DATA STRUCTURE, WHICH THE PROGRAM CODE CAN UTILIZE TO RECOGNIZE AND INTERPRET KEYWORDS, IN REAL-TIME, BY COGNITIVELY ANALYZING THE LEANED KEYWORDS    ~330

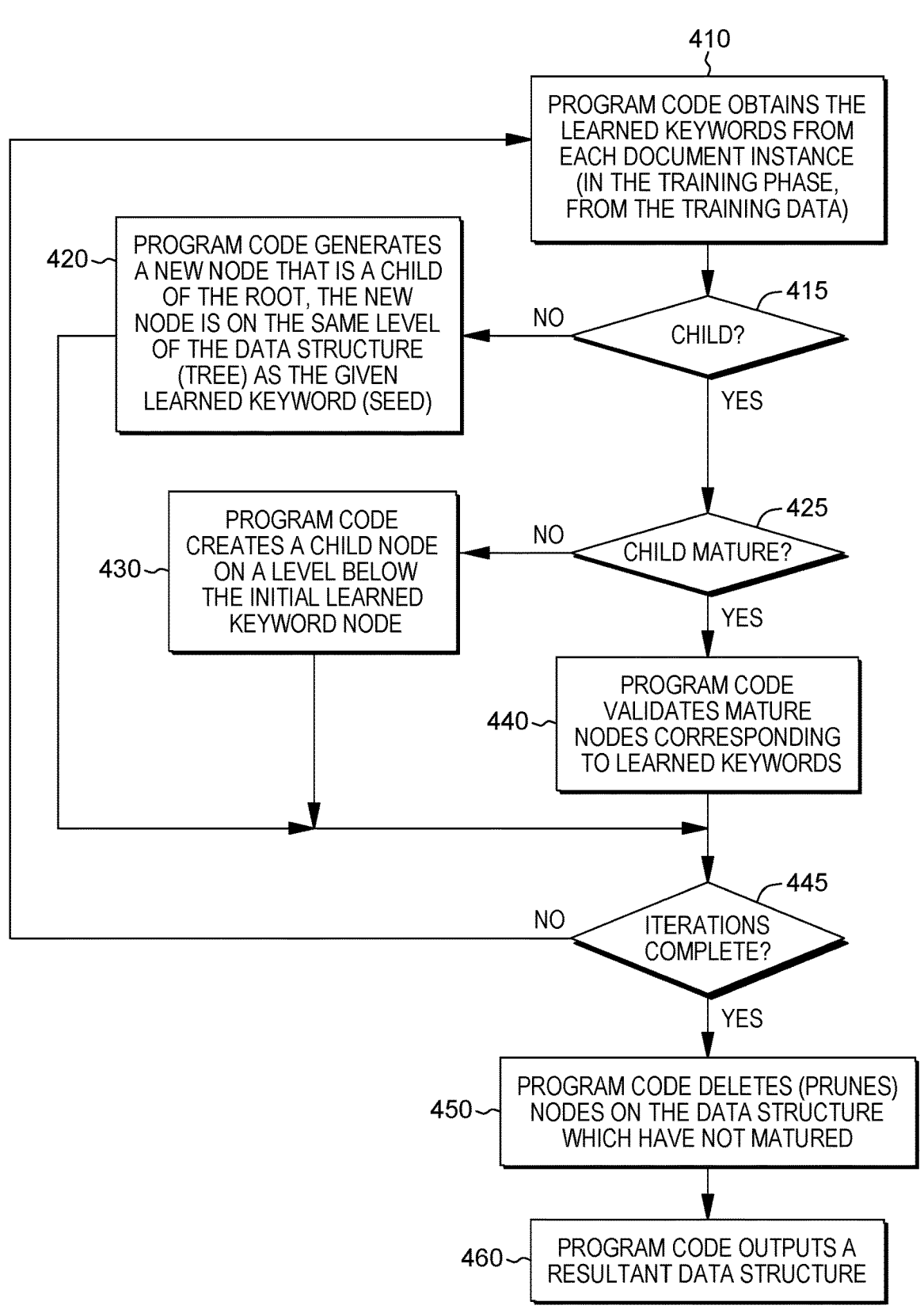

410 PROGRAM CODE OBTAINS THE LEARNED KEYWORDS FROM EACH DOCUMENT INSTANCE (IN THE TRAINING PHASE, FROM THE TRAINING DATA)

415 CHILD?

420 PROGRAM CODE GENERATES A NEW NODE THAT IS A CHILD OF THE ROOT, THE NEW NODE IS ON THE SAME LEVEL OF THE DATA STRUCTURE (TREE) AS THE GIVEN LEARNED KEYWORD (SEED)

NO / YES

425 CHILD MATURE?

430 PROGRAM CODE CREATES A CHILD NODE ON A LEVEL BELOW THE INITIAL LEARNED KEYWORD NODE

NO / YES

440 PROGRAM CODE VALIDATES MATURE NODES CORRESPONDING TO LEARNED KEYWORDS

445 ITERATIONS COMPLETE?

NO / YES

450 PROGRAM CODE DELETES (PRUNES) NODES ON THE DATA STRUCTURE WHICH HAVE NOT MATURED

460 PROGRAM CODE OUTPUTS A RESULTANT DATA STRUCTURE

MACHINE LEARNING OF KEYWORDS

BACKGROUND

Meetings, which are facilitated utilizing various meeting software and hardware, including remote meeting architectures, are fairly common in the course of business in many industries and across different corporate cultures. During many of the meetings, both the oral and written content shared by various participants can include terms that are unique to the subject, setting, technology, participants, etc. These terms are often referred to as technical jargon, acronyms, abbreviations, and terms of art. Unfortunately, the specificity of these terms to certain factors in the meeting (location, industry, participants, subject, audience, etc.) can create issues for a participant unfamiliar with the terms who is unfamiliar with the terms and attempts to find out the meaning of the terms. For example, many of these terms may lie outside of the purview of a standard dictionary. When a participant is unable to comprehend terms utilized during a meeting, the participant will not experience the full benefit of attending the meeting.

SUMMARY

Shortcomings of the prior art are overcome and additional advantages are provided through the provision of a method for providing context for keywords. The method includes, for instance: progressively obtaining, by one or more processors, textual content from a meeting hosting system, wherein the textual content is hosted on the meeting hosting system during a pre-defined interval; progressively parsing, by the one or more processors, the textual content to identify potential keywords; iteratively cognitively analyzing, by the one or more processors, the potential keywords to determine which potential keywords comprise seed keywords, wherein the seed keywords meet a maturity threshold for inclusion in a data structure, wherein the iterative cognitive analysis of each potential keyword of the potential keywords is repeated a pre-defined number of times, and wherein the iteratively cognitively analyzing comprises generating and updating the data structure; and outputting, by the one or more processors, based on completing the pre-defined number of times, the data structure comprising the seed keywords.

Shortcomings of the prior art are overcome and additional advantages are provided through the provision of a computer program product for providing context for keywords. The computer program product comprises a storage medium readable by a processing circuit and storing instructions for execution by the processing circuit for performing a method. The method includes, for instance: progressively obtaining, by the one or more processors, textual content from a meeting hosting system, wherein the textual content is hosted on the meeting hosting system during a pre-defined interval; progressively parsing, by the one or more processors, the textual content to identify potential keywords; iteratively cognitively analyzing, by the one or more processors, the potential keywords to determine which potential keywords comprise seed keywords, wherein the seed keywords meet a maturity threshold for inclusion in a data structure, wherein the iterative cognitive analysis of each potential keyword of the potential keywords is repeated a pre-defined number of times, and wherein the iteratively cognitively analyzing comprises generating and updating the data structure; and outputting, by the one or more processors, based on completing the pre-defined number of times, the data structure comprising the seed keywords.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 is a workflow illustrating certain aspects of an embodiment of the present invention;

FIG. 4 is a workflow illustrating certain aspects of an embodiment of the present invention;

DETAILED DESCRIPTION

Figure 1:
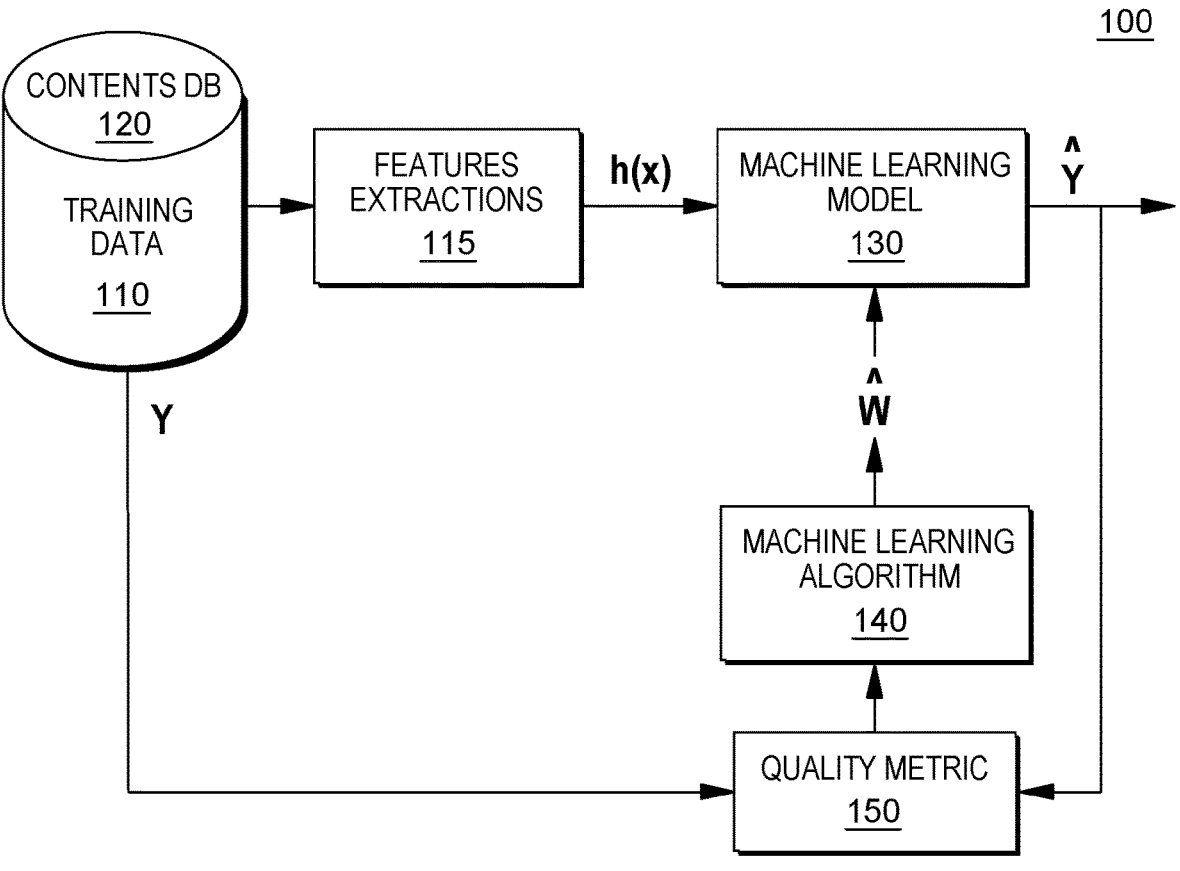
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
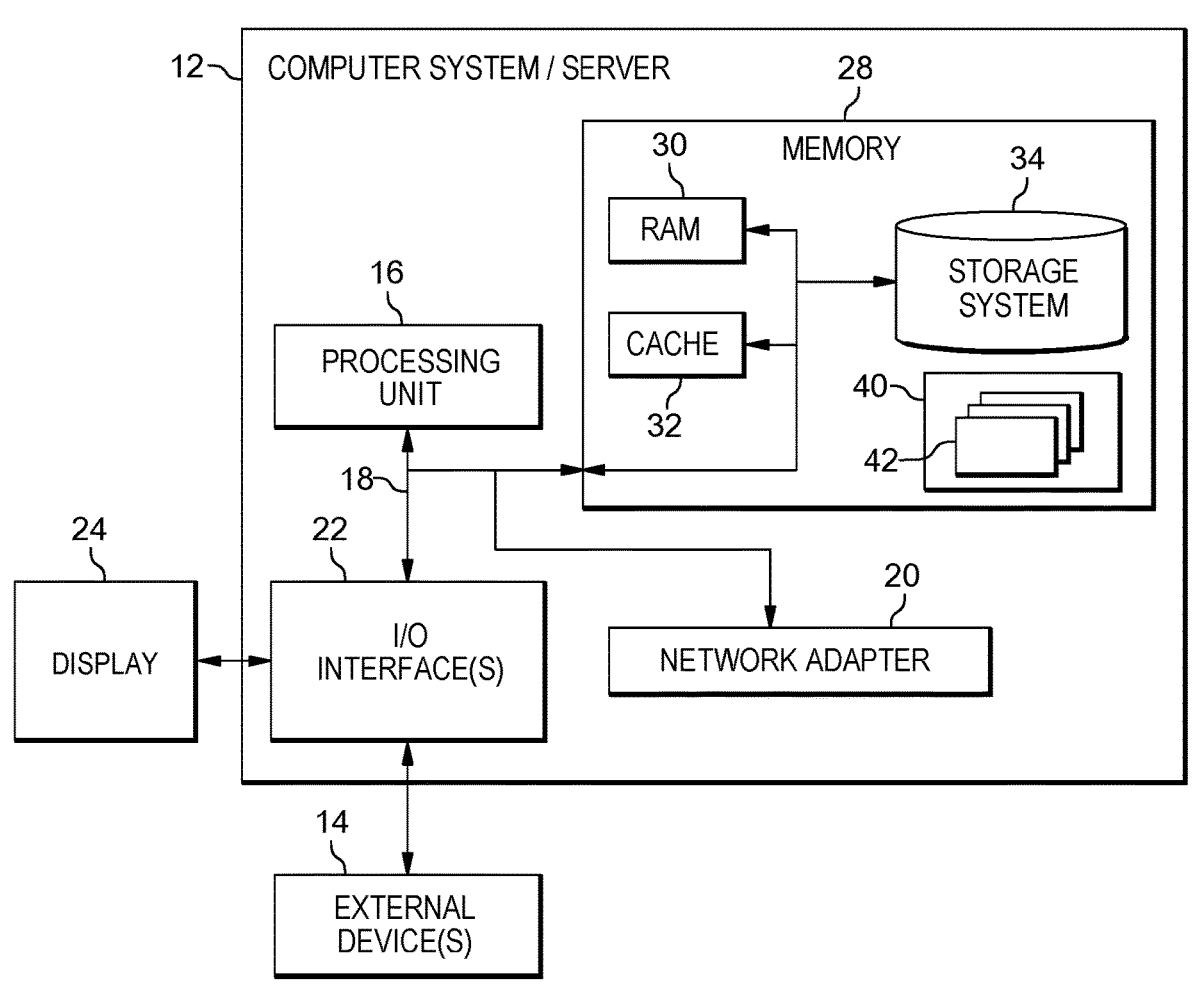
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computing system where program code executing on one or more processors utilize a cognitive analysis to machine learn terms or keywords utilized during gatherings of users (meetings, conferences, events, etc.). For simplicity, the word "meeting" will be utilized throughout to encompass all types of gatherings where content is shared among attendees. The keywords machine learned by the program code include, but are not limited to, terms of art, jargon, acronyms, and/or abbreviations. In embodiments of the present invention, because these keywords are outside the purview of a dictionary (beings terms of art or other specialized or customized references), program code in embodiments of the present invention utilizes connectivity of computing devices in distributed computing systems, including but not limited to cloud computing environments, to access various data sources as part of the machine learning. These data sources can include, but are not limited to, electronic calendar invites, minutes of meetings, discussions during the meetings, and presentations during the meetings. In some embodiments of the present invention, the machine learning includes the program code generating and consistently updating a data structure (e.g., a tree), with keywords utilized during meetings, based on a learning rate, and the program code removing (e.g., pruning) keywords from the data structure, based on the keywords not meeting a maturity threshold (i.e., removing immature keywords).

Aspects of various embodiments of the present invention are inextricably tied to computing and provide significant advantages over existing approaches to providing meanings or context for terms utilized during a meeting or other gathering. First, as will be discussed in greater detail herein, embodiments of the present invention provide a cognitive learning framework called Adaptive Growth and Self Pruning (AGSP), enabling program code executing on one or more processors to continuously learn keywords (terms) utilized in meetings by: 1) generating and training an algorithm based on a learning rate, a learning rate function, and maturity threshold of meeting keywords; and 2) pruning a dataset generated by the program code, based on the machine learning, to remove the immature keywords. The machine learning, which is a basis of the AGSP, which enables the program code to recognize, dynamically, terms utilized in meetings, and generate and maintain a data structure to continue this recognition, is an aspect tied to computing. Additionally, one or more processors executing program code, provide term recognition, in real-time, which is another aspect tied to computing. Embodiments of the present invention are also inextricably tied to computing also because the program code in these embodiments may also utilize the digital communication channels and the real-time communications, enabled in a distributed computing environment, to facilitate interpretation of keywords utilized in meetings hosted on meeting software.

Second, embodiments of the present invention provide various aspects that represent significant improvements over existing approaches to machine learning terms. For example, some existing approaches address this issue of learning terms (that are not easily discoverable through references such as dictionaries) by identifying units that comprise the terms (potential new words) and attempting to match these units to known words to discover a meaning and retaining the previously unknown terms in a database. Other than this approach to a similar issue differing from aspects of embodiments in the present invention, this approach does not include program code that utilizes an adaptive growth approach, where the program code not only generates a data structure, but also prunes terms from the data structure based on maturity levels that the program code assigns to the terms. Another existing approach attempts to interpolate the meanings of unknown terms utilized in a meeting by recording the content of a meeting and establishing pointers to the meeting content. Like the earlier mentioned existing approach, this approach also does not generate an analogous data structure or prune terms from the data structure based on maturity levels that the program code assigns to the terms. Finally, another existing approach attempts to circumvent the issue of unknown content (undefined terms) in a meeting by generating a meeting profile to characterize the meeting as a whole and make it available to participants. This approach leaves content undefined and thus, aspects of embodiments of the present invention provide improvements over this approach by utilizing adaptive growth to generate a data structure to provide meaning to content, but managing the content through pruning of terms (content) based on maturity level.

In some embodiments of the present invention, program code executing on one or more processors, utilizes an existing cognitive analysis tool or agent to learn meeting keywords by accessing data sources through various means, including but not limited to: listening to discussions, analyzing calendar invites, parsing minutes of meetings, etc. Some embodiments of the present invention utilize IBM Watson® as the cognitive agent. IBM Watson® is a product of International Business Machines Corporation. IBM Watson® is a registered trademark of International Business Machines Corporation, Armonk, N.Y., US. In embodiments of the present invention, the program code interfaces with IBM Watson® APIs to perform a cognitive analysis of obtained data, in some embodiments of the present invention, the program code interfaces with the application programming interfaces (APIs) that are part of a known cognitive agent, such as the IBM Watson® Application Program Interface (API), a product of International Business Machines Corporation, to determine the context of keywords and interpret the keywords.

In some embodiments of the present invention, the program code trains aspects of the IBM Watson® Application Program Interface (API) to learn these meeting keywords on its own by obtaining data sources, including those discussed above. Specifically, in some embodiments of the present invention, certain of the APIs of the IBM Watson® API comprise a cognitive agent that includes one or more programs, including, but are not limited to, natural language classifiers, Retrieve and Rank (i.e., a service available through the IBM Watson® Developer Cloud that can surface the most relevant information from a collection of documents), concepts/visual insights, trade off analytics, document conversion, and/or relationship extraction. In an embodiment of the present invention, one or more programs analyze the data obtained by the program code across various sources utilizing one or more of a natural language classifier, retrieve and rank APIs, and trade off analytics APIs. The IBM Watson® Application Program Interface (API) can also provide audio related API services, in the event that the collected data includes audio, which can be utilized by the program code, including but not limited to natural language processing, text to speech capabilities, and/or translation.

Utilizing a cognitive agent, including but not limited to IBM Watson®, program code in embodiments of the present invention performs AGSP, meaning that it recognizes, dynamically and automatically, terms utilized in meetings, and generates and maintains a data structure to continue this recognition, is an aspect tied to computing. Additionally, the program code not only intelligently adds keywords to the data structure, it also prunes entries based on the learning rate, learning rate function, and a defined maturity threshold.

In embodiments of the present invention, the program code applies machine learning algorithms to generate and train algorithms based on a learning rate, a learning rate function, and a maturity threshold of meeting keywords. The program code can train these algorithms, based on patterns for a given client (and/or across all clients). FIG. 1 is an example of a machine learning training system 100 that can be utilized to perform cognitive analyses of meeting content and meeting-related content across various data sources to generate data structures, including algorithms based on a learning rate, a learning rate function, and a maturity threshold of meeting keywords, which control the generation and maintenance of keyword data structures. Machine learning (ML) solves problems that cannot be solved by numerical means alone. In this ML-based example, program code extracts various features/attributes from training data 140 (e.g., data collected from various data sources relevant to meetings, including but not limited to discussions, calendar invites, minutes of meetings), which may be resident in one or more databases 120 comprising meeting-related data. The features are utilized to develop a predictor function, h(x), also referred to as a hypothesis, which the program code utilizes as a machine learning model 130. In identifying various keywords in the training data 110, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the keywords. The program code may utilize a machine learning algorithm 140 to train the machine learning model 130 (e.g., the algorithms utilized by the program code), including providing weights for the conclusions, so that the program code can languages in multilingual input in accordance with the predictor functions that comprise the machine learning model 130. The conclusions may be evaluated by a quality metric 150. By selecting a diverse set of training data 110, the program code trains the machine learning model 130 to identify and weight various attributes (e.g., features, patterns) that correlate to various keywords.

Figure 2:
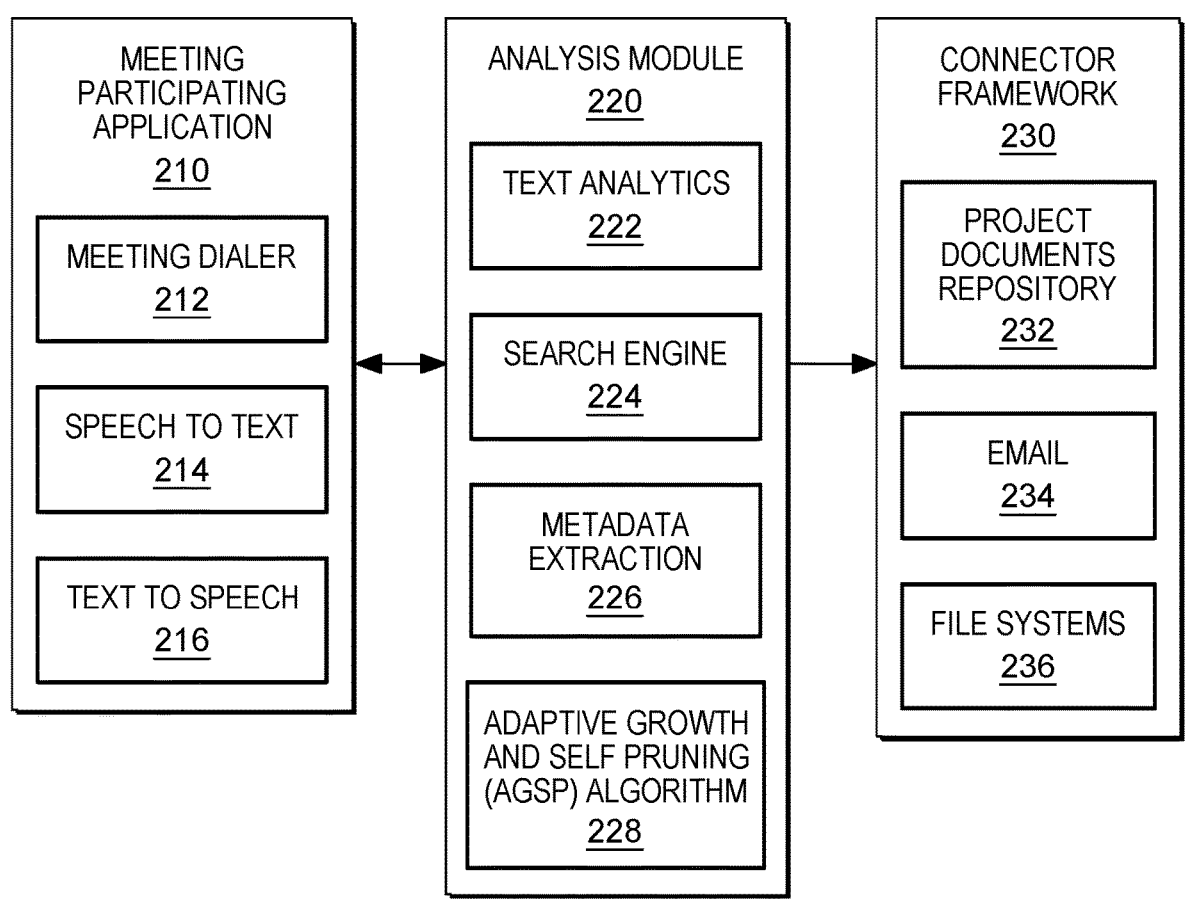
FIG. 2 is an illustration of a technical environments where certain aspects of some embodiments of the present invention can be implemented.

FIG. 2 is a technical architecture 200 into which aspects of embodiments of the present invention can be implemented. This technical architecture 200 illustrates functionality of certain aspects of the present invention as being contained in specific modules. This modular representation of functionality is provided for illustrative purposes only and is not meant to suggest any technical limitations.

The technical architecture 200 includes a meeting participation application 210. It is during meetings initiated and hosted within the application 210 that certain terms or keywords will emerge that the program code will utilize to generate a data structure. This data structure will self-grow, recursively, such that the terms that are being used repeatedly in the meeting participation application 210 will become seeds and over multiple iterations, these seeds will have a strong base, which can be referred to as a library (e.g., a hashtag library). In some embodiments of the present invention, the program code organizes the keywords in an adaptive tree that utilizes a self-organizing map to grow the tree and the significance of each seed. To enable initiation of meetings, the meeting participation application 210 includes a meeting dialer 212. Content of the meeting can take the form of both oral and written communication (audio and text), thus, the meeting participation application 210 includes both speech to text 214 and text to speech 216 capabilities. As aforementioned, aspects of existing cognitive agents, such as IBM Watson® can be utilized to provide speech to text 214 and text to speech 216 capabilities.

In some embodiments of the present invention, the program code utilizes a neural network to analyze the conversation thread to identify keywords. Neural networks are a biologically-inspired programming paradigm which enable a computer to learn from observational data, in this case, conversation threads. This learning is referred to as deep learning, which is a set of techniques for learning in neural networks. Neural networks, including modular neural networks, are capable of pattern (e.g., keyword) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., keywords) in data (i.e., neural networks are non-linear statistical data modeling or decision making tools). In general, program code utilizing neural networks can model complex relationships between inputs and outputs and identify keywords in data. Because of the speed and efficiency of neural networks, especially when parsing multiple complex data sets, neural networks and deep learning provide solutions to many problems in speech recognition and natural language processing, which the program code in embodiments of the present invention accomplished as part of the program code analyzing data from a given meeting, by accessing data in a meeting participation application 210.

Some embodiments of the present invention may utilize a neural network (NN) to predict additional keywords based on the inputs provided. Utilizing the neural network, the program code can predict subsequent keywords, or subsequent uses of existing keywords. The program code program code obtains (or derives) the initial keywords from a meeting to generate an array of values (possible keywords) to input into input neurons of the NN. Responsive to these inputs, the output neurons of the NN produce an array that includes the predicted keywords as well as predicted additional uses of identified keywords. The program code can automatically annotate keywords based on the perceived validity.

In some embodiments of the present invention, a neuromorphic processor or trained neuromorphic chip can be incorporated into the computing resources executing the program code. One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million (2^28). Memory, computation, and communication are handled in each of the 4096 neurosynaptic cores, so TrueNorth circumvents the von-Neumann-architecture bottlenecks and is very energy-efficient.

Returning to FIG. 2, the technical architecture 200 also includes an analysis module 220, which includes various analysis tools, including an adaptive growth and self-pruning (AGSP) algorithm, which can be generated and maintained utilizing a cognitive agent. As will be discussed in greater detail herein, program code performs a textual analysis 222 of content of a meeting hosted by the meeting participation application 210 and utilizes a search engine 224 to identify keywords that cannot be interpolated or interpreted utilizing standard tools, such as a dictionary. The program code extracts metadata 226 related to the keywords, from the meeting contents, from the meeting hosted on the meeting participation application 210, and with the identified keywords, obtains data from various sources utilizing a connector framework 230.

Program code in embodiments of the present invention utilizes a connector framework 230 access various data sources, including but not limited to project document repositories 232, email 234, and file systems 236. In some embodiments of the present invention, the connector framework 230 include a connector that enables an IBM® Integration Bus to interact with external applications or data sources (e.g., project document repositories 232, email 234, and file systems 236). In some embodiments of the present invention, the connector framework 230 provides a connector for the program code of the analysis module 220, including the AGSP algorithm 228, which receives data obtained by the program code, determines meanings of the keywords, and generates and consistently updates a data structure (e.g., a tree), with the keywords, based on a learning rate, and removes (e.g., prunes) keywords from the data structure, based on the keywords not meeting a maturity threshold (i.e., removing immature keywords). The connector framework 230 encapsulates complex interactions between the various data sources and the analysis module 220, which would otherwise be achieved utilizing multiple message flow nodes.

FIG. 3 is a workflow 300 that illustrates various aspects of some embodiments of the present invention and depicts the program code generating a data structure that will self-grow, recursively, such that the terms that are being used repeatedly in a meeting will become seeds and over multiple iterations, these seeds will comprise a (hashtag) library. In some embodiments of the present invention, the data structure is a tree with weighted nodes. Thus, each tree can be represented as +T, where each node is $+x_n$ and each node has a corresponding weight represented by $+y_n$. In an embodiment of the present invention, the program code executing on one or more processors initiates generation of a data structure for interpreting keywords in meetings by setting learning parameters for including perspective keywords in the data structure, where the data structure is generated and maintained by the program code in an iterative (e.g., recursive) machine learning process (310). In some embodiments of the present invention, the learning parameters are: 1) learning rate; 2) learning rate function; and 3) maturity threshold.

The program code defines the parameters of learning rate, learning rate function, and maturity threshold. Learning rate ( ) corresponds to how frequently a keyword should appear in a meeting (or a group of meetings), or over a defined period of time, to reach a threshold number for capture by the AGSP algorithm. Thus, by governing when keywords should be added to the data structure, the learning rate governs the growth of the data structure (e.g., tree) the program code generates to facilitate interpretation of keywords. Maturity Threshold $(M_t)$ corresponds to a minimum number of times that a keyword has been referenced to make the keyword an important concept that the program code should learn and thus, include in the data structure (e.g., identify as a seed). The learning rate function (f) is the relationship between learning rate and maturity threshold.

Returning to FIG. 3, the program code trains one or more machine learning algorithms to learn keywords from training data (e.g., FIG. 1, 140) (320). As also illustrated in FIG. 1, the training data is utilized to train one or more machine learning algorithms. In embodiments of the present invention, the training data can include electronic documents. The program code utilizes these documents to train the one or more machine learning algorithms to ultimately generate the data structure. To train the algorithms, the program code provides each document instance (e.g., electronic document) to the algorithms for a specified number of iterations (k), with +k representing the number of iterations that are required for the program code to learn the keywords in a given document instance. In some embodiments of the present invention, for each iteration, the program code provides each document instance, randomly, to the algorithms. In some embodiments of the present invention, the program code utilizes a random number generator to establish an order for presentation of the document instances. The program code randomizes the order of the document instances to minimize impacts of the order of the presentation on the training. The program code learns keywords after k iterations and the program code facilitates the processing of the leaned keywords (seeds), iteratively, by the algorithm.

In some embodiments of the present invention, the program code generates a keyword data structure, which the program code can utilize to recognize and interpret keywords, in real-time, by cognitively analyzing the leaned keywords (330). The program code determines, during the cognitive analysis, whether each leaned keyword should be included in the data structure and the weight/duration of this inclusion. This cognitive analysis includes the program code applying an AGSP algorithm to the learned keywords and the context in which the learned keywords were discovered. Although the cognitive analysis process is iterative (machine learning is ongoing), an initial cognitive analysis of the learned keywords can be understood as training the program code and any cognitive analysis tool (e.g., IBM Watson®) utilized through a cognitive loop of specialized learning.

FIG. 4 is a more detailed workflow 400 of the cognitive analysis of the learned keywords by the program code (e.g., FIG. 3, 330), in some embodiments of the present invention. The program code determines a weight (importance) for each learned keyword, and the weight of each keyword determines how, for how long, and if, it is to be included in the data structure. In some embodiments of the present invention, the program code obtains the learned keywords from each document instance (in the training phase, from the training data) (410) and determines, for each learned keyword, if a child exists (415). The program code utilizes the cognitive analysis, which it performs in accordance with the parameters, to determine whether each keyword will become a seed in the data structure the program code generates and if so, how long the keyword will remain a seed. Thus, by determining whether a child exists, the program code is determining whether a keyword is utilized enough to qualify for utilization in the data structure, as a seed.

A document instance (e.g., meeting, data source, etc.) can be a root for a tree data structure. Keywords that are adjudged to be significant (comply with weight and maturity parameters) will become the seeds. As aforementioned, to determine whether to generate a seed for a given learned keyword, the program code determines whether a child exists for each leaned keyword (415). Based on determining that a child does not exist for a given learned keyword, the program code generates a node that is a child of the root, meaning that this new node is on the same level of the data structure (tree) as the given learned keyword (seed) (420). The program code assigns a default weight to each node on this level (e.g., $y_i$=1). The program code assigns the same weight to each newly-created node. The variable "i" represents the number of times, iterations, the node has been adapted iteratively. As the process of obtaining learned keywords is continuous, the program code can continue to evaluate a given keyword to see whether a child exists for a pre-defined number of iterations (+k) (445). The continuous evaluation enables the program code to generate and update a data structure contemporaneously with a given meeting.

Based on determining that a child does exist, the program code determines if the child is mature (having been referenced a minimum number of times for inclusion in the data structure) (425). Based on determining that a child does exist, provided that the program code has not already determined that this learned keyword is mature (i.e., the learned keyword is still immature because it has not met the maturity threshold, $M_t$, not having been referenced a minimum number of times for inclusion in the data structure), the program code creates a child node on a level below the initial learned keyword node, thus further removed from the root (430). In some embodiments of the present invention, the program code assigns a weight of $x_i$=$(1-)^n$ and this newly created node is assigned a weight of ($x_i$=1). As represented in FIG. 4, the program code continues evaluating each learned keyword for a pre-defined number of iterations (+k) and certain of the keywords may reach maturity during this iterative process (445).

In some embodiments of the present invention, the program code validates mature nodes corresponding to learned keywords (i.e., seeds) (440). Mature nodes are nodes that originate from seeds that meet the maturity threshold. As discussed above, applying AGSP algorithm enables the program code to progressively adjust the data structure, for example, as parameters change. Thus, the integrity and accuracy of the data structure is guarded by the program code validating mature nodes. In some embodiments of the present invention, from a second seed onward, the program code considers the root and the mature nodes corresponding to the previous seeds. To validate the nodes, the program code determines if each node has a child node and if the child node was processed by the program code. If the child node was not processed, the program code generates a new child node based on a current seed, adding its weight. The weight of the child seed can be represented by Equation 1 below.

$$x^i=(1-)x_i+y. \quad \text{(Equation 1)}$$

Through the iterative process, the program code determines whether nodes that were not previously adjudged mature by the program code are mature (425). The program code adapts the weight of the child nodes to the weight of the parent, as represented by Equation 2 below.

$$x_n=(1-)^n x_i \quad \text{(Equation 2)}$$

Following this weight adaptation, the program code determines if the weight of the node, with respect to the weight of the parent node, is less than or equal to the maturity threshold ($M_t$). Based on the program code determining that the weight is less than or equal to the maturity threshold, the program code determines that the node is mature. This evaluation can be represented by Equations 3 and 4 below.

$$M_t=(1-)^n | n=\log_{(1-)} M^t \quad \text{(Equations 3-4)}$$

The program code processes the learned keywords (sequences, seeds, and children) for a pre-defined number of iterations (445). As discussed above, +k represents the number of iterations for the program code to learn the keywords in a given document instance. Based on completing the iterations, the program code deletes (prunes) nodes on the data structure which have not matured (450). The program code outputs a resultant data structure (e.g., an algorithm which is a tree) where each path from the root to each node corresponds to the frequent substrings (i.e., keywords that matured into seeds), which appeared in the input dataset (e.g., document instance) (460).

The example below further illustrates the application of the maturity threshold to the data structure and the inclusion in the cognitive analysis of a cognitive quantification of the maturity threshold. As discussed above, following this weight adaptation, the program code determines if the weight of the node, with respect to the weight of the parent node, is less than or equal to the maturity threshold ($M_t$). In one example, $x_0$ is an initial node in a tree, T, generated and maintained by the program code. The adaptive weight of node $x_0$ is a value, y. The learning rate corresponds to how frequently a keyword should be for it to be captured by the AGSP algorithm, while, as aforementioned, the maturity threshold, $M_t$, corresponds to minimum times a keyword has been referenced to qualify as a seed in the data structure. In this example, $x_1, x_2, \ldots x_n$ are the weights of the nodes after being cognitively adapted +n times by the program code. Based on determining that a does not child exist for a given learned keyword, the program code generates a node that it adds as a child to the root, which is $x_1$=$(1-)x_0+y$, which is $x_1$=$(1-)^1 x_0+y$. A default weight assigned to newly created nodes is 1. Thus, $x_1$, a weight of the node xo after being cognitively adapted one time. If y is equal to 0, for the sake of this illustration, the weight adaptation for n times is $x_n$=$(1-)^n x_0$. Assuming in this example that $x_0$=1, and $M_t$ is the maturity threshold which should be achieved after the program code adapts the node $x_0$ for n iterations, the value of $M_t$ can be represented by $M_t$=$(1-)^n$. Thus, the program code determines that the number of times that a substring corresponding to the node must appear for it to be identified as a seed, in this example, by the program code, is n=log $_{(1-)} M_t$=$1-^n M_t$. In this example, the output of the machine learning process of the program code is a tree data structure where each path from the root to each node corresponds to the most frequent substrings, i.e., seeds, which appeared in the input dataset that has been learned +n times.

Embodiments of the present invention include a computer-implemented method, a computer program product, and a computing system, where program code executing on one or more processors progressively obtains textual content from a meeting hosting system, where the textual content is hosted on the meeting hosting system during a pre-defined interval. The program code progressively parses the textual content to identify potential keywords. The program code iteratively cognitively analyzes the potential keywords to determine which potential keywords comprise seed keywords, where the seed keywords meet a maturity threshold for inclusion in a data structure, where the iterative cognitive analysis of each potential keyword of the potential keywords is repeated a pre-defined number of times, and where the iteratively cognitively analyzing comprises generating and updating the data structure. The program code outputs, based on completing the pre-defined number of times, the data structure comprising the seed keywords.

In some embodiments of the present invention, the program code determines an interpretation for each seed keyword of the seed keywords, based on accessing one or more data sources via a connector framework. The program code retains the interpretations in the data structure.

In some embodiments of the present invention, the program code obtains textual content from the meeting hosting system comprising a seed keyword of the seed keywords. The program code queries the data structure, to access an interpretation of the seed keyword. The program code obtains the interpretation based on the querying. The program code transmits, to one or more clients connected to the meeting hosting system, the interpretation, where the one or more clients receive the interpretation in real-time.

In some embodiments of the present invention, the program code iteratively cognitively analyzes by, for each potential keyword: generating, based on frequency of the potential keyword, a node off a root from the potential keyword, where the node off the root comprises an outermost node of a branch; determining if a subsequent appearance of the potential keyword occurs in the progressively obtained textual content, where the determining comprises; based on determining that the subsequent appearance occurs, generating, a child node from the outermost node of the branch, where the child node becomes the outermost node of a branch; and based on determining that the subsequent appearance does not occur, generating a new node from the root, where the new node becomes the outermost node of the branch; and repeating the determining, a predefined number of times. The program code can also determine if the branch comprising the potential keyword is of a length meeting the maturity threshold for inclusion in a data structure. Based on determining that the branch is not of the length, the program code can also delete the potential keyword from the data structure. Based on determining that the branch is of the length, the program code can also retain the potential keyword in the data structure as a seed keyword.

In some embodiments of the present invention, the program code obtains a new maturity threshold. The program code validates that the seed keyword meets the new maturity threshold. The program code can determine, based on the validating, that the seed keywords does not meet the maturity threshold and delete the seed keyword from the data structure.

In some embodiments of the present invention, the data structure comprises a tree and each seed keyword comprises a branch of the tree.

In some embodiments of the present invention, the program code progressively obtains the textual content by: utilizing application programming interfaces to convert visual, audio, and video content from the meeting hosting system into a portion of the textual content.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the computing resource executing the meeting participation application 210 (FIG. 2), the computing resources executing the analysis module 220 (FIG. 2), and the various data sources accessible via the connector framework 230 (FIG. 2) can all be examples as a cloud computing node 10 (FIG. 5) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an imple- mentation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, com- puter system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be under- stood that although not shown, other hardware and/or soft- ware components could be used in conjunction with com- puter system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, imple- mentation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilater- ally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi- tenant model, with different physical and virtual resources dynamically assigned and reassigned accord- ing to demand. There is a sense of location indepen- dence in that the consumer generally has no control or knowledge over the exact location of the provided resources but may be able to specify location at a higher level of abstraction (e.g., country, state, or datacenter).

Rapid elasticity: capabilities can be rapidly and elasti- cally provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, band- width, and active user accounts). Resource usage can be monitored, controlled, and reported, providing trans- parency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking compo- nents (e.g., host firewalls).

Deployment Models are as follows:

Private cloud: the cloud infrastructure is operated solely for an organization. It may be managed by the organi- zation or a third party and may exist on-premises or off premises.

Community cloud: the cloud infrastructure is shared by several organizations and supports a specific commu- nity that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by stan- dardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
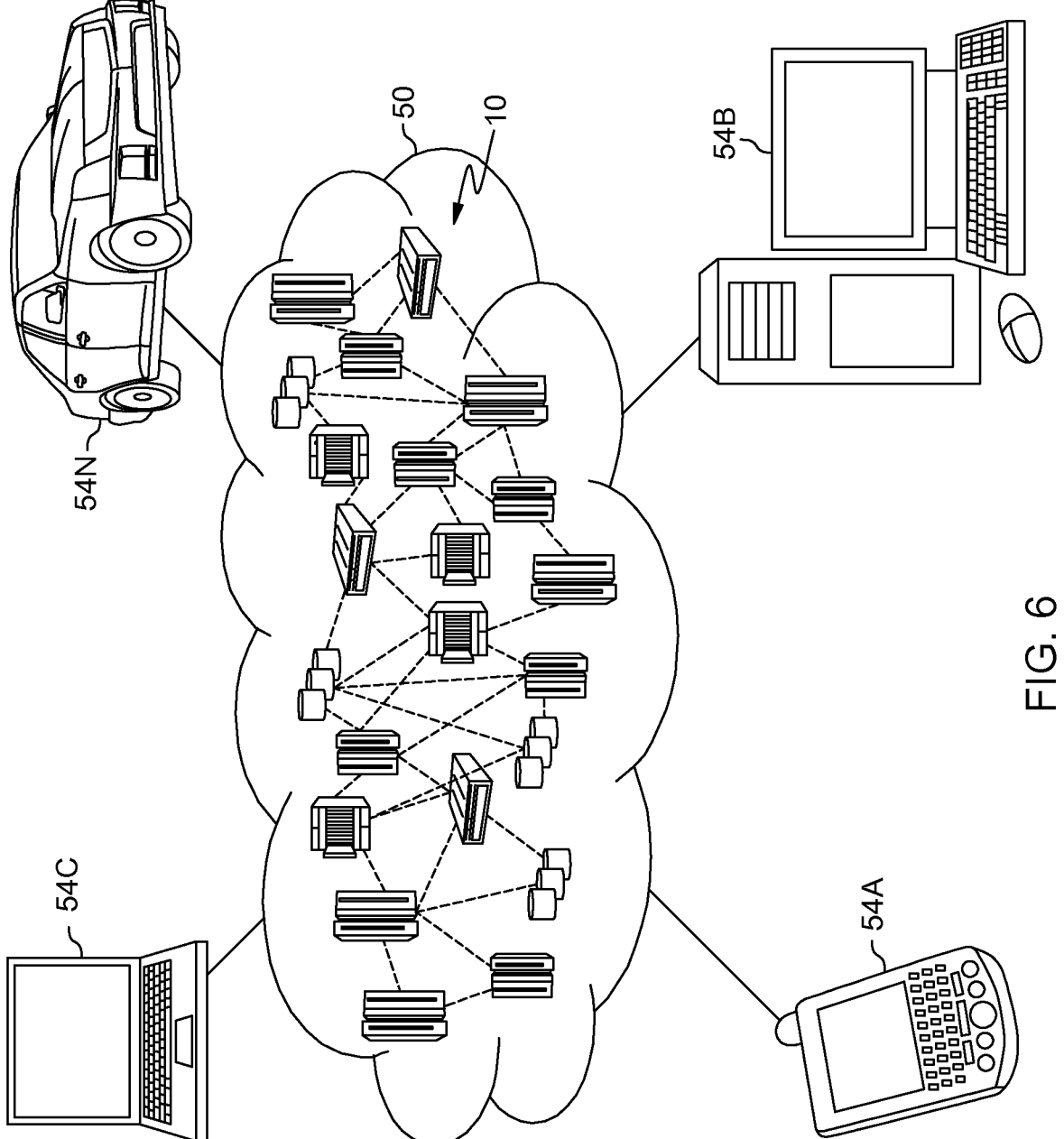
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
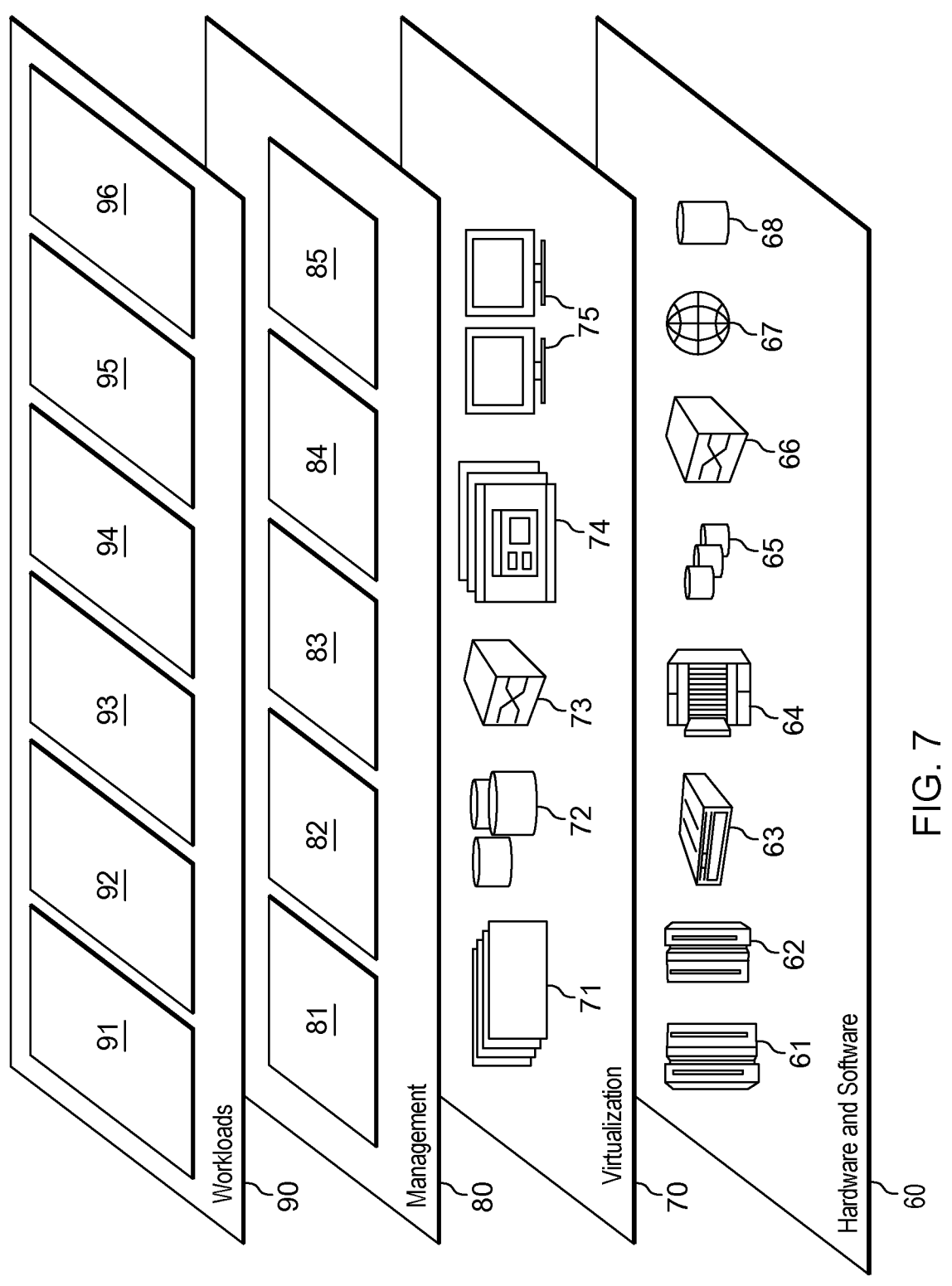
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a data structure for identifying keywords in electronic content 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

progressively obtaining, by one or more processors, textual content from a meeting hosting system, wherein the textual content is hosted on the meeting hosting system during a pre-defined interval;

progressively parsing, by the one or more processors, the textual content to identify potential keywords from the textual content;

controlling, by the one or more processors, utilizing an adaptive growth and self-pruning (AGSP) framework, a growth rate of a data structure, wherein the data structure facilitates interpretation of keywords, the controlling comprising:

iteratively cognitively analyzing, by the one or more processors, the potential keywords to determine which potential keywords comprise seed keywords and to determine which existing seed keywords in a past iteration of data structure are no longer seed keywords, wherein the iteratively cognitively analyzing comprises determining that the seed keywords cannot be interpolated utilizing a dictionary, wherein the seed keywords are determined based on applying a learning rate function, wherein the learning rate function is a relationship between learning rate and maturity threshold of a keyword, wherein the maturity threshold corresponds to a minimum number of times that the keyword is referenced to make the keyword a seed keyword, wherein the learning rate corresponds to a pre-defined threshold of how frequently a given keyword should appear during the pre-defined interval for capture by an AGSP algorithm of the AGSP framework, wherein a seed keyword is an important concept for the one or more processors to learn and include in the data structure, wherein the iterative cognitive analysis of each potential keyword of the potential keywords is repeated a pre-defined number of times, and wherein the iteratively cognitively analyzing comprises generating and updating the data structure;

outputting, by the one or more processors, based on completing the pre-defined number of times, the data structure comprising the seed keywords, wherein the outputting comprises pruning the existing seed keywords in the past iteration of the data structure which are no longer seed keywords from the data structure;

determining, by the one or more processors, an interpretation for each seed keyword of the seed keywords, based on accessing one or more applications and one or more data sources via a connector of the AGSP framework, wherein the connector comprises an integration bus, wherein the one or more applications and one or more data sources are external to the meeting hosting system, wherein the connector is a single node that encapsulates interactions between the one or more processors and the one or more application and interactions between the one or more processors and the one or more data sources; and applying, by the one or more processors, the data structure to facilitate real-time interpretation of the keywords on the meeting hosting system during the pre-defined interval.

2. The computer-implemented method of claim 1, further comprising:

retaining, by the one or more processors, the interpretations in the data structure.

3. The computer-implemented method of claim 2, further comprising:

obtaining, by the one or more processors, textual content from the meeting hosting system comprising a seed keyword of the seed keywords;

querying, by the one or more processors, the data structure, to access an interpretation of the seed keyword;

obtaining, by the one or more processors, the interpretation based on the querying; and transmitting, by the one or more processors, to one or more clients connected to the meeting hosting system, the interpretation, wherein the one or more clients receive the interpretation in real-time.

4. The computer-implemented method of claim 1, wherein the iteratively cognitively analyzing comprises:

for each potential keyword:

generating, by the one or more processors, based on frequency of the potential keyword, a node off a root from the potential keyword, wherein the node off the root comprises an outermost node of a branch;

determining, by the one or more processors, if a subsequent appearance of the potential keyword occurs in the progressively obtained textual content, wherein the determining comprises:

based on determining that the subsequent appearance occurs, generating, by the one or more processors, a child node from the outermost node of the branch, wherein the child node becomes the outermost node of the branch; and based on determining that the subsequent appearance does not occur, generating, by the one or more processors, a new node from the root, wherein the new node becomes the outermost node of the branch; and repeating, by the one or more processors, the determining, a pre-defined number of times.

5. The computer-implemented method of claim 4, further comprising:

determining, by the one or more processors, if the branch comprising the potential keyword is of a length meeting the maturity threshold for inclusion in the data structure.

6. The computer-implemented method of claim 5, further comprising:

based on determining that the branch is not of the length, deleting, by the one or more processors, the potential keyword from the data structure.

7. The computer-implemented method of claim 5, further comprising:

based on determining that the branch is of the length, retaining, by the one or more processors, the potential keyword in the data structure as a seed keyword.

8. The computer-implemented method of claim 7, further comprising:

obtaining, by the one or more processors, a new maturity threshold; and validating, by the one or more processors, that the seed keyword meets the new maturity threshold.

9. The computer-implemented method of claim 8, further comprising:

determining, by the one or more processors, based on the validating, that the seed keyword does not meet the maturity threshold; and deleting, by the one or more processors, the seed keyword from the data structure, based on determining that the seed keyword does not meet the maturity threshold.

10. The computer-implemented method of claim 1, wherein the data structure comprises a tree and each seed keyword comprises a branch of the tree.

11. The computer-implemented method of claim 1, wherein progressively obtaining the textual content further comprises:

utilizing, by the one or more processors, application programming interfaces to convert visual, audio, and video content from the meeting hosting system into a portion of the textual content.

12. The method of claim 1, wherein the cognitively analyzing further comprises:

determining, by the one or more processors, for each seed keyword of the seed keywords, a duration of the seed keyword in the data structure.

13. The method of claim 12, further comprising:

continuously updating, by the one or more processors, the data structure, based on the duration of each seed keyword.

14. A computer program product comprising:

a computer readable storage medium readable by one or more processors and storing instructions for execution by the one or more processors for performing a method comprising:

progressively obtaining, by the one or more processors, textual content from a meeting hosting system, wherein the textual content is hosted on the meeting hosting system during a pre-defined interval;

progressively parsing, by the one or more processors, the textual content to identify potential keywords from the textual content;

controlling, by the one or more processors, utilizing an adaptive growth and self-pruning (AGSP) framework, a growth rate of a data structure, wherein the data structure facilitates interpretation of keywords, the controlling comprising:

iteratively cognitively analyzing, by the one or more processors, the potential keywords to determine which potential keywords comprise seed keywords and to determine which existing seed keywords in a past iteration of data structure are no longer seed keywords, wherein the iteratively cognitively analyzing comprises determining that the seed keywords cannot be interpolated utilizing a dictionary, wherein the seed keywords are determined based on applying a learning rate function, wherein the learning rate function is a relationship between learning rate and maturity threshold of a keyword, wherein the maturity threshold corresponds to a minimum number of times that the keyword is referenced to make the keyword a seed keyword, wherein the learning rate corresponds to a pre-defined threshold of how frequently a given keyword should appear during the pre-defined interval for capture by an AGSP algorithm of the AGSP framework, wherein a seed keyword is an important concept for the one or more processors to learn and include in the data structure, wherein the iterative cognitive analysis of each potential keyword of the potential keywords is repeated a pre-defined number of times, and wherein the iteratively cognitively analyzing comprises generating and updating the data structure;

outputting, by the one or more processors, based on completing the pre-defined number of times, the data structure comprising the seed keywords, wherein the outputting comprises pruning the existing seed keywords in the past iteration of the data structure which are no longer seed keywords from the data structure;

determining, by the one or more processors, an interpretation for each seed keyword of the seed keywords, based on accessing one or more applications and one or more data sources via a connector of the AGSP framework, wherein the connector comprises an integration bus, wherein the one or more applications and one or more data sources are external to the meeting hosting system, wherein the connector is a single node that encapsulates interactions between the one or more processors and the one or more application and interactions between the one or more processors and the one or more data sources; and applying, by the one or more processors, the data structure to facilitate real-time interpretation of the keywords on the meeting hosting system during the pre-defined interval.

15. The computer program product of claim 14, the method further comprising:

retaining, by the one or more processors, the interpretations in the data structure;

obtaining, by the one or more processors, textual content from the meeting hosting system comprising a seed keyword of the seed keywords;

querying, by the one or more processors, the data structure, to access an interpretation of the seed keyword;

obtaining, by the one or more processors, the interpretation based on the querying;

and transmitting, by the one or more processors, to one or more clients connected to the meeting hosting system, the interpretation, wherein the one or more clients receive the interpretation in real-time.

16. The computer program product of claim 14, wherein the iteratively cognitively analyzing comprises:

for each potential keyword:

generating, by the one or more processors, based on frequency of the potential keyword, a node off a root from the potential keyword, wherein the node off the root comprises an outermost node of a branch;

determining, by the one or more processors, if a subsequent appearance of the potential keyword occurs in the progressively obtained textual content, wherein the determining comprises based on determining that the subsequent appearance occurs, generating, by the one or more processors, a child node from the outermost node of the branch, wherein the child node becomes the outermost node of the branch; and based on determining that the subsequent appearance does not occur, generating, by the one or more processors, a new node from the root, wherein the new node becomes the outermost node of the branch; and repeating, by the one or more processors, the determining, a pre-defined number of times.

17. The computer program product of claim 16, the method further comprising:

determining, by the one or more processors, if the branch comprising the potential keyword is of a length meeting the maturity threshold for inclusion in the data structure.

18. The computer program product of claim 17, the method further comprising:

based on determining that the branch is not of the length, deleting, by the one or more processors, the potential keyword from the data structure.

19. The computer program product of claim 17, the method further comprising:

based on determining that the branch is of the length, retaining, by the one or more processors, the potential keyword in the data structure as a seed keyword;

obtaining, by the one or more processors, a new maturity threshold;

validating, by the one or more processors, that the seed keyword meets the new maturity threshold;

determining, by the one or more processors, based on the validating, that the seed keywords does not meet the maturity threshold; and deleting, by the one or more processors, the seed keyword from the data structure, based on determining that the seed keyword does not meet the maturity threshold.

20. A system comprising: a memory;

one or more processors in communication with the memory;

program instructions executable by the one or more processors via the memory to perform a method, the method comprising:

progressively obtaining, by the one or more processors, textual content from a meeting hosting system, wherein the textual content is hosted on the meeting hosting system during a pre-defined interval;

progressively parsing, by the one or more processors, the textual content to identify potential keywords from the textual content;

controlling, by the one or more processors, utilizing an adaptive growth and self-pruning (AGSP) framework, a growth rate of a data structure, wherein the data structure facilitates interpretation of keywords, the controlling comprising:

iteratively cognitively analyzing, by the one or more processors, the potential keywords to determine which potential keywords comprise seed keywords and to determine which existing seed keywords in a past iteration of data structure are no longer seed keywords, wherein the iteratively cognitively analyzing comprises determining that the seed keywords cannot be interpolated utilizing a dictionary, wherein the seed keywords are determined based on applying a learning rate function, wherein the learning rate function is a relationship between learning rate and maturity threshold of a keyword, wherein the maturity threshold corresponds to a minimum number of times that the keyword is referenced to make the keyword a seed keyword, wherein the learning rate corresponds to a pre-defined threshold of how frequently a given keyword should appear during the pre-defined interval for capture by an AGSP algorithm of the AGSP framework, wherein a seed keyword is an important concept for the one or more processors to learn and include in the data structure, wherein the iterative cognitive analysis of each potential keyword of the potential keywords is repeated a pre-defined number of times, and wherein the iteratively cognitively analyzing comprises generating and updating the data structure;

outputting, by the one or more processors, based on completing the pre-defined number of times, the data structure comprising the seed keywords, wherein the outputting comprises pruning the existing seed keywords in the past iteration of the data structure which are no longer seed keywords from the data structure;

determining, by the one or more processors, an interpretation for each seed keyword of the seed keywords, based on accessing one or more applications and one or more data sources via a connector of the AGSP framework, wherein the connector comprises an integration bus, wherein the one or more applications and one or more data sources are external to the meeting hosting system, wherein the connector is a single node that encapsulates interactions between the one or more processors and the one or more application and interactions between the one or more processors and the one or more data sources; and applying, by the one or more processors, the data structure to facilitate real-time interpretation of the keywords on the meeting hosting system during the pre-defined interval.

* * * * *